(12) United States Patent
Kanno

(10) Patent No.: US 6,252,609 B1
(45) Date of Patent: Jun. 26, 2001

(54) PROGRAMMABLE IMAGE PROCESSING APPARATUS AND METHOD

(75) Inventor: Akiko Kanno, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/111,732

(22) Filed: Jul. 8, 1998

(30) Foreign Application Priority Data

Jul. 9, 1997 (JP) .................................. 9-184037
Jun. 23, 1998 (JP) ................................ 10-175837

(51) Int. Cl.[7] .................................. G06T 1/00
(52) U.S. Cl. .......................... 345/501; 358/523
(58) Field of Search ........................ 345/501, 502, 345/507–509; 358/1.1, 1.6, 1.15–1.17, 518, 523

(56) References Cited

U.S. PATENT DOCUMENTS

| 5,109,252 | 4/1992 | Schott, Jr. ........................... 355/202 |
| 5,363,454 | * 11/1994 | Udagawa et al. ................. 382/165 |
| 5,375,001 | * 12/1994 | Oh ...................................... 358/518 |
| 5,604,860 | 2/1997 | McLaughlin et al. ............ 345/326 |
| 6,040,924 | * 3/2000 | Tamagaki et al. ................. 358/523 |
| 6,041,140 | * 3/2000 | Binns et al. ........................ 382/209 |

FOREIGN PATENT DOCUMENTS

| 0 478 334 | 4/1992 | (EP) | ................................ H04N/1/00 |
| 0 703 701 | 3/1996 | (EP) | ................................ H04N/1/60 |
| 96 30871 | 10/1996 | (WO) | ............................... G06T/5/40 |
| 97 30375 | 8/1997 | (WO) | ............................... H04N/1/23 |

OTHER PUBLICATIONS

Research Disclosure, "reproduction apparatus providing user manuel and other documentation", Mar. 1991, pp. 201–203.*

* cited by examiner

*Primary Examiner*—Kee M. Tung
(74) *Attorney, Agent, or Firm*—Fitzpatrick, Cella, Harper & Scinto

(57) ABSTRACT

Disclosed are an image processing apparatus and method improved to lower apparatus cost and to simplify function selection in comparison with the prior-art image processing apparatus, which is required to be equipped with hardware that implements all available functions regardless of the fact that all of these functions are not actually used. Specifically, when power has been introduced to the apparatus, a function desired to be implemented is selected from functions displayed on a display screen and internal data of a programmable gate array corresponding to the selected function is read out of a ROM. Next, the data that has been read is downloaded to the programmable gate array that implements the selected function. A control program for controlling the selected function is then started up selectively to establish the operating state. The selected function is thus implemented by the programmable gate array.

32 Claims, 8 Drawing Sheets

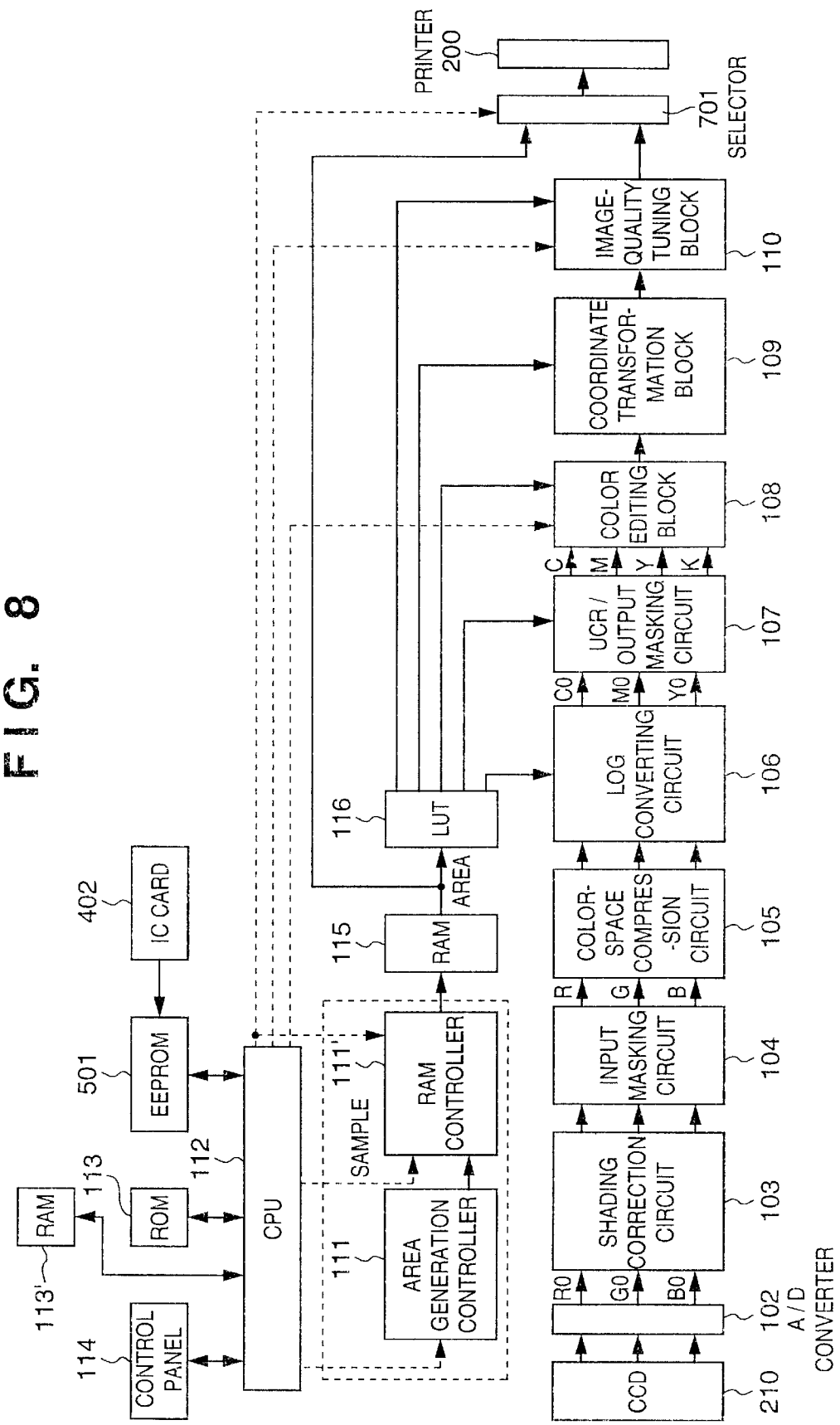

PROGRAMMABLE IMAGE PROCESSING APPARATUS AND METHOD

BACKGROUND OF THE INVENTION

This invention relates to an image processing apparatus and method and, more particularly, to an image processing apparatus, which is typified by a digital full-color copier, having various editing functions and adjustment functions, and to the associated image processing method.

Modern image processing apparatus such as digital full-color copiers come equipped not only with image-quality tuning functions for adjusting coloring, density and sharpness but also with various editing functions such as a coordinate moving function for moving coordinates attendant upon enlargement/reduction processing and expression of italics, etc., and a function for forming an image of a special color and adding on images.

These editing functions are implemented mainly by hardware, which is provided for each individual function. More specifically, in accordance with the specifications of each individual manufactured image processing apparatus, the apparatus is equipped with the hardware that necessary to implement these specifications. If a user wishes to employ a certain function, the user causes the utilizable functions to be displayed hierarchically on the screen of a control panel, searches the displayed functions for the function desired and specifies the desired function by making the appropriate input to the apparatus.

With the above-described example of the prior art, however, all of the various image processing functions are implemented by hardware. Moreover, the items of hardware are not necessarily installed in the apparatus to support the functions on a one-to-one basis. If even one function for implementing the specifications of the apparatus is included in certain hardware, therefore, it is necessary to equip the apparatus with this hardware that includes the function even if other functions of the hardware are not used. The result frequently is waste from the standpoint of equipment production cost. In addition, since functions unnecessary in terms of the apparatus specifications are included, the user is compelled to search for a desired function among many functions displayed on the screen of the control panel when selecting the desired function and setting the apparatus to the function. This complicates the selection operation required of the user.

SUMMARY OF THE INVENTION

Accordingly, it is an object of the present invention to provide an image processing apparatus and method in which it is possible to easily set a desired function from a plurality of functions.

According to one aspect of the present invention, the foregoing object is attained by providing an image processing apparatus for implementing a plurality of image processing functions by a programmable gate array, comprising: a first memory storing data necessary to implement the plurality of image processing functions; designating means for designating a desired image processing function from the plurality of image processing functions; and loading means for reading data that corresponds to the image processing function designated by the designating means out of the first memory and loading the data into the programmable gate array so that the desired image processing function can be implemented.

The above designating means preferably includes a display displaying the plurality of image processing functions; and selection means for selecting the desired image processing function from the plurality of image processing functions displayed on the display.

The plurality of image processing functions includes an image editing function and an image-quality tuning function.

The apparatus may further comprises image forming means for forming an image based upon image data obtained as a result of implementing the image processing function.

The apparatus may further comprise input means for inputting data necessary to implement the plurality of image processing functions from an external device such as an IC card, and a second memory for temporarily storing the input data.

In such case the loading means may read the necessary data out of the second memory and load the data into the programmable gate array.

The apparatus may further comprise display control means for performing control so as to display the plurality of image processing functions on the display screen based upon data necessary to implement the plurality of image processing functions, which are included in the external device. Control may be performed by the display control means in such a manner that after a selection is made by the selection means, only manipulation information relating to a selected image processing function is displayed on the display screen.

Further, in a case where the external device includes sample image data which indicates results of implementation when an image processing function decided in accordance with the data included in the external device has been executed, the sample image data is entered and control is performed in such a manner that the sample image data is output to the image forming means, whereby a sample image is output.

According to another aspect of the present invention, the foregoing object is attained by providing an image processing method for implementing a plurality of image processing functions by a programmable gate array based upon data necessary to implement the plurality of image processing functions, which have been stored in a memory, comprising: a designating step of designating a desired image processing function from the plurality of image processing functions; and a loading step of reading data that corresponds to the image processing function designated at the designating step out of the memory and loading the data into the programmable gate array so that the desired image processing function can be implemented.

Note that the above designating step preferably includes: a display step of displaying the plurality of image processing functions on a display screen; and a selection step of selecting the desired image processing function from the plurality of image processing functions displayed on the display screen.

According to still another aspect of the present invention, the foregoing object is attained by providing a computer program product comprising a computer readable medium having computer program code, for executing download processing, the product including: designation process procedure codes for designating a desired image processing function from a plurality of image processing functions; and download processing procedure codes for reading data that corresponds to the image processing function designated in the designation process out of a memory in which data necessary to implement the plurality of image processing functions have been stored, and loading the data into a programmable gate array, which implements the image processing functions, so that the desired image processing function can be implemented.

Note that the above designation process procedure codes preferably include: display process procedure codes for displaying the plurality of image processing functions on a display screen; and selection process procedure codes for selecting the desired image processing function from the plurality of image processing functions displayed on the display screen.

In accordance with the present invention as described above, when a desired function is designated from the plurality of image processing functions, data corresponding to the designated image processing function is read out of a memory in which the data necessary to implement the plurality of image processing functions has been stored, and the data is loaded in a programmable gate array which executes image processing functions, thus making it possible to implement the desired function.

The invention is particularly advantageous since only a function actually used is selected and made executable. This makes it unnecessary to provide the apparatus with hardware having all functions relating to image processing, as is required in the prior art.

As a result, it is possible to reduce the scale of hardware and lower the cost of the apparatus.

Further, only manipulation information relating to a function rendered executable by function selection is displayed on the display screen, thereby reducing the amount of information displayed on the screen. This makes it possible to dispense with the troublesome operation with which the operator is confronted with the prior-art apparatus.

Furthermore, the result obtained when a selected function is implemented is output to as a sample image. This makes it possible for the operator to visually confirm the operation of the selected function in advance.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a block diagram showing the construction of a circuit relating to image processing, particularly printout of a sample image, executed by a color copier in accordance with a third embodiment of the present invention.

DESCRIPTION OF THE PREFERRED EMBODIMENTS

Preferred embodiments of the present invention will now be described in detail in accordance with the accompanying drawings.

Here a digital full-color copier will be described as an example.

(First Embodiment)

[Overall construction of the apparatus]

Figure 1:
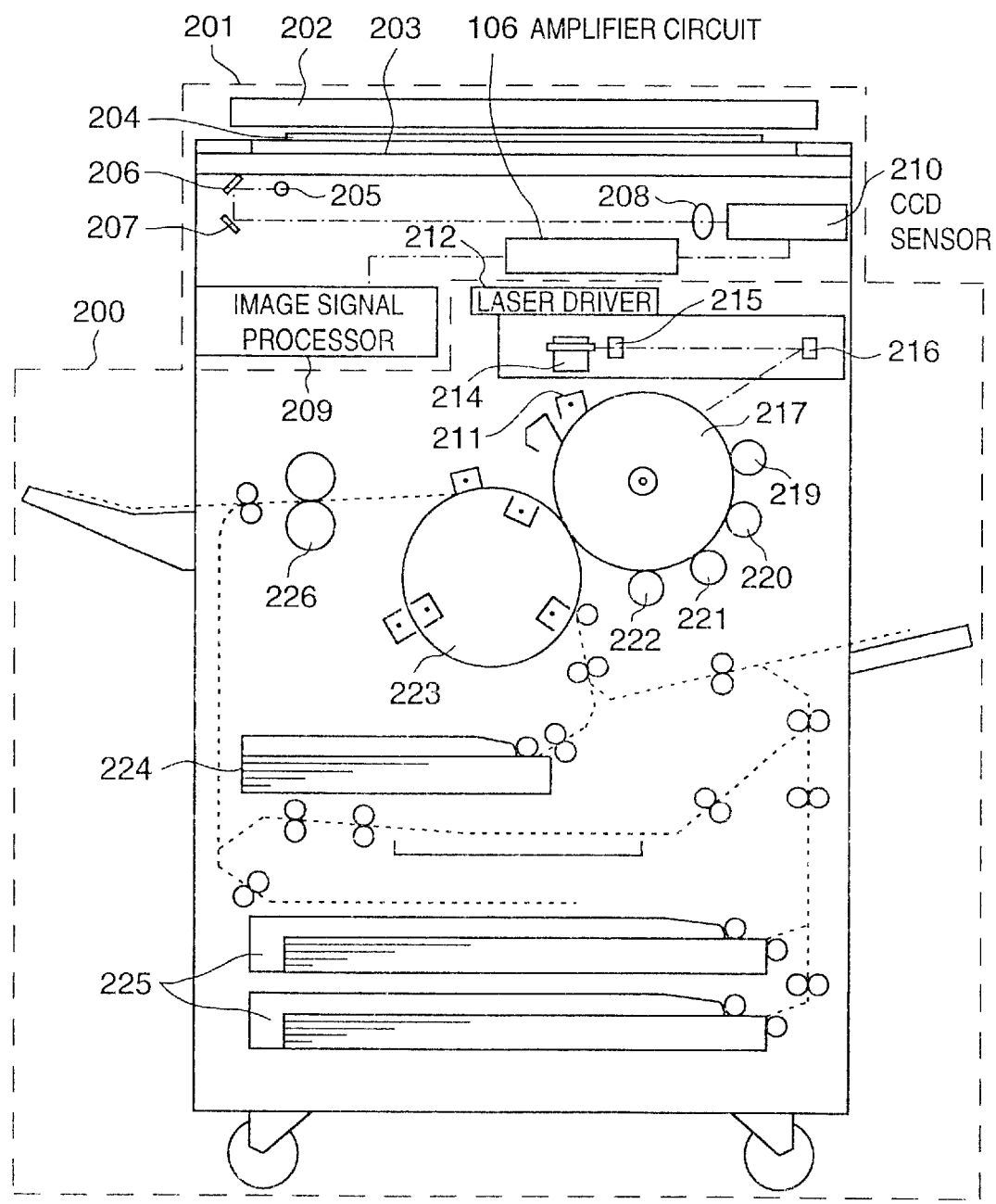
FIG. 1 is a sectional side view illustrating the general construction of a color copier serving as a first embodiment of the present invention.

FIG. 1 is a sectional side view illustrating the general construction of a color copier serving as a typical embodiment of the present invention.

As shown in FIG. 1, the color copier includes an image scanner unit 201 for reading an original 204 and executing digital signal processing, and a printer unit 200 for printing an image, which has been processed by the image scanner unit 201, on a paper in full color.

The image scanner unit 201 has a digitizer 202 serving also as an original pressure plate. The digitizer 202 is used to designate an area on the original 204 by pressing, with a pen accessory, a desired point on the original 204 placed on the digitizer 202 prior to a copying operation.

Operation when copying is performed will now be described.

The original 204 is placed on a glass platen 203 and start of a copying operation is designated using a control panel, whereupon the original 204 is illuminated with light from a halogen lamp 205. Light reflected from the original impinges upon mirrors 206, 207 and is imaged on a 3-line sensor (referred to as a "CCD" below) 210 by a lens 208.

The CCD 210 separates the light information into red (R), green (G) and blue (B) components, the signal representing this light information is amplified by an amplifier circuit 106 and the amplified signal is then sent to an image signal processor 209.

The halogen lamp 205, mirror 206 and mirror 207 are moved mechanically in a direction (referred to as the "sub-scan direction" below) perpendicular to the electrical scanning direction (referred to as the "main-scan direction" below) of the line sensor, with the lamp 205 and mirror 206 being transported at a velocity v and the mirror 207 at a velocity v/2. The entire surface of the original is scanned as a result.

The image signal processor 209 electrically processes the read signal, separates the signal into magenta (M), cyan (C), yellow (Y) and black (BK) density signals and sends these signals to the printer unit 200. According to this embodiment, one color component density signal from among the four color components M, C, Y, BK is sent to the printer unit 200 per scan of the original by the image scanner unit 201. Accordingly, a full color image is output once in a total of four scans of the original.

A density signal sent to the printer unit 200 is converted to a laser drive signal by a laser driver 212, the resulting signal driving a semiconductor laser (not shown). The laser beam scans across a photosensitive drum 217, which has been charged to a uniform potential by a charging device 211, via a polygon mirror 214, f-θ lens 215 and mirror 216, thereby forming an electrostatic latent image on the drum.

The apparatus further includes a magenta developing device 219, a cyan developing device 220, a yellow developing device 221 and a black developing device 222. The four developing devices contact the photosensitive drum 217 alternatively so that the electrostatic latent images corresponding to the respective color components M, C, Y, BK and formed on the photosensitive drum 217 are developed by the corresponding toners.

The apparatus further includes a transfer drum 223. Paper fed from a paper cassette 224 or 225 is wound round the transfer drum 223 so that the toner image that has been developed on the photosensitive drum 217 is transferred to the paper.

After the images that have been formed by the four colors M, C, Y, BK are successively transferred to the paper, the paper is discharged from the apparatus upon being passed through a fixing unit 226.

The foregoing is an overview of the copying operation.

[Construction of image processor]

Figure 2:
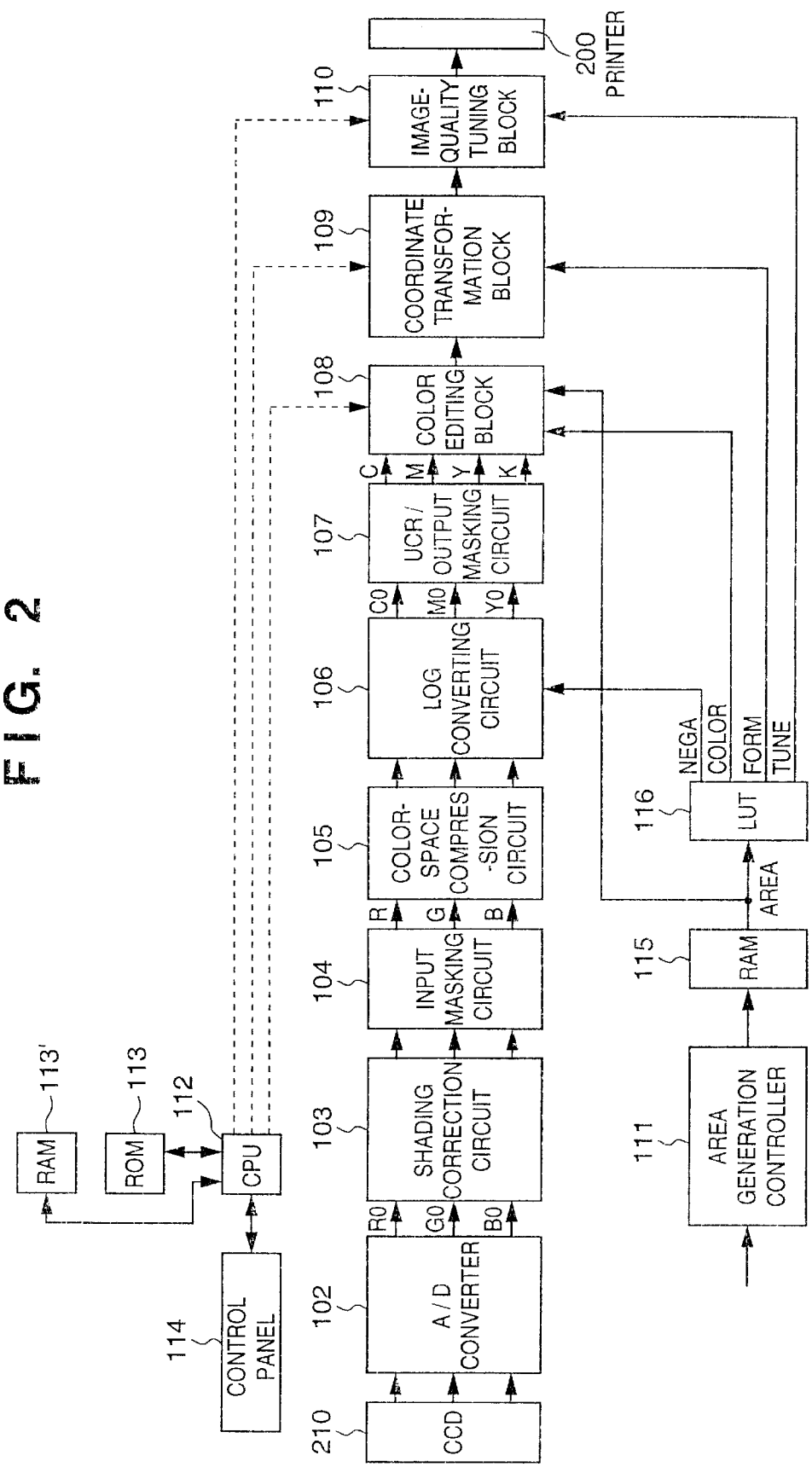
FIG. 2 is a block diagram showing the functional construction of the color copier illustrated in FIG. 1.

FIG. 2 is a block diagram showing the functions, chiefly of the image signal processor 209 in the image scanner unit 201, for executing image signal processing.

As shown in FIG. 2, light-quantity signals R0, G0, B0 of the three color components read by the CCD 210 and converted to digital signals by an A/D converter 102 are processed by a well-known shading correction circuit 103 and input masking circuit 104 to obtain light-quantity signals R (red), G (green) and B (blue) of three colors in standard color space.

The R, G, B signals are compressed to colors in the reproducible range of the printer unit 200, which is the final stage, by a color-space compression circuit 105, after which the resulting signals are converted to density signals C0 (cyan), M0 (magenta) and Y0 (yellow), respectively, by a color-quantity/density converter circuit (referred to as a "LOG converting circuit" below) 106. The density signals C0, M0, Y0 are processed by a UCR/masking circuit 107 so as to be converted to density signals of the toner colors, namely of the four color components C, M, Y and BK.

The shading correction circuit 103, input masking circuit 104, color-space compression circuit 105, LOG converting circuit 106 and UCR/output masking circuit 107 are processing circuitry common to all copiers for the purpose of reproducing an image, by using the toners of the four colors C, M, Y, BK with which the printer unit 200 is equipped, from the image signals of the three R, G, B components generated based upon the image of the original read by the CCD 201. In this embodiment, therefore, these circuits are implemented by hardware the functions whereof are fixed.

A color editing processing block 108 and image-quality tuning processing block 110, which follow the above-mentioned circuitry, are each implemented by a programmable gate array (referred to as a "PGA" below). The inputs to the color editing processing block 108 are the density signals C, M, Y, BK of the four color components; the output is the image signal of one color component (referred to as "X" below), from among the four color components, that is currently being used for printing by the printer unit 200.

A coordinate transformation block 109 subjects the image signal X to movement, alteration of copying magnification and form manipulation processing such as formation of italics. The functions of this block are fixed in this embodiment and are implemented by hardware circuitry.

When necessary the image-quality tuning processing block 110 subjects the image signal X to image tuning and form manipulation processing such as limitation of color reproduction space by correction of density F value, modification of copying magnification, italicization and spatial filtering, and outputs the result of processing to the printer unit 200 as a printer output signal. The printer unit 200 prints the image electrophotographically in accordance with PWM (pulse-width modulation).

An area generation controller 111 generates an area signal AREA, in which an area code has been allocated to each area, in accordance with image position coordinates entered from the digitizer 202 or an image area designated by the user based upon a specific color in the image, and writes the area signal AREA to a RAM 115 prior to image formation.

When image formation is carried out, the area signal AREA is read out of the RAM 115 in synchronization with the formation of the image. An area-code look-up table (referred to as a "LUT" below) 116, in which data has been set beforehand in accordance with an input from the user, converts the area signal AREA to a NEGA signal (negative/positive control signal), COLOR signal (color editing control signal), FORM signal (form manipulation control signal) and TUNE signal (image-quality tuning control signal). These signals change over the processing of each of the processing blocks. A function changeover designated for each area specified in each processing block can be executed by the particular signal, and editing processing that differs for each area can be carried out. As a result, it is possible to form an image that has been edited for each area.

If a single function is implemented by the processing blocks 108 through 110 in a case where editing processing that differs for each area is executed, processing that has been allocated to the same block will not change for each area.

In this embodiment, the arrangement is such that the color editing processing block 108 and image-quality tuning processing block 110 are each constructed by a PGA and the functions thereof are implemented selectively. However, it goes without saying that the present invention is not limited to this arrangement. For example, in regard to the coordinate transformation block 109 constituted solely by hardware circuitry in the above-described embodiment, it is possible to adopt an arrangement in which only processing for altering copying magnification is executed by a hardware circuit and the form manipulation processing such as image movement and italicization is implemented by PGA, whereby it will be possible to selectively execute processing for image movement and italicization and processing for color editing.

[Setting of internal data of PGA]

A CPU 112 in FIG. 2 controls various settings of the image processor 209 and various displays relating to control of functions implemented. A ROM 113 stores internal data to be set in the color editing block 108 and image-quality tuning block 110, which are PGAs, as well as the control program of the CPU 112. A RAM 113' is used as a work area for execution of the control program by the CPU 112. The control panel 114, besides allowing entry of copy operation commands such as start reset, is equipped with a display unit. A touch-sensitive panel is affixed to the display screen of this display unit. By touching a position corresponding to the position of an icon displayed on the screen of the touch-sensitive panel, the user is capable of keying in inputs (using so-called "soft keys"). As a result, the user can select and enter the parameters of various functions and options. The entered signals are sent to the CPU 112.

Control for selecting and executing functions in the apparatus having the above-described construction will be described with reference to the flowchart shown in FIG. 3.

Figure 3:
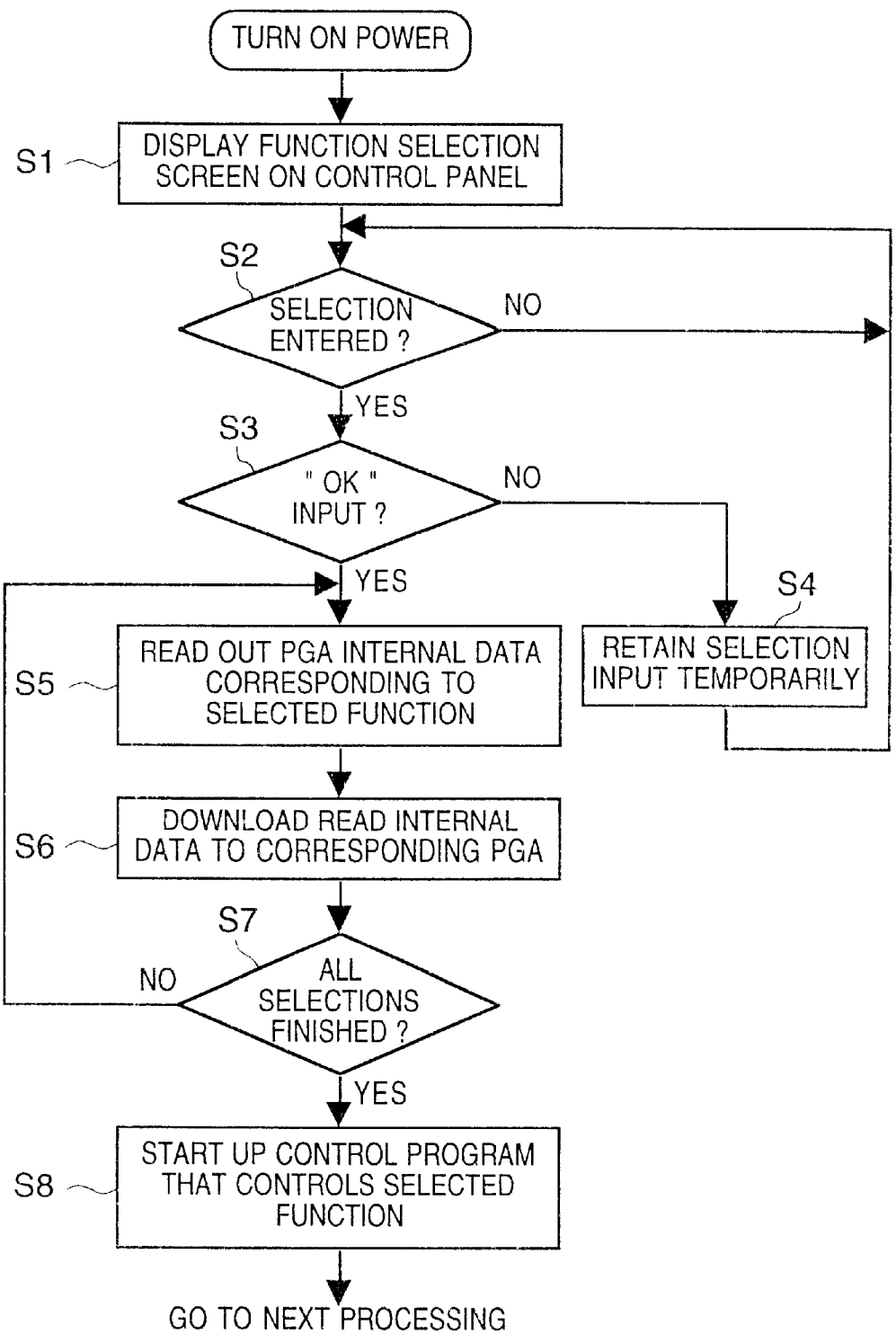
FIG. 3 is a flowchart showing control for setting a required function in a programmable gate array.

FIG. 3 is a flowchart showing control for setting a required function in a programmable gate array in this embodiment.

It should be noted that a transition is made to the processing of FIG. 3 when the power supply of the copier is turned on.

Figure 4:
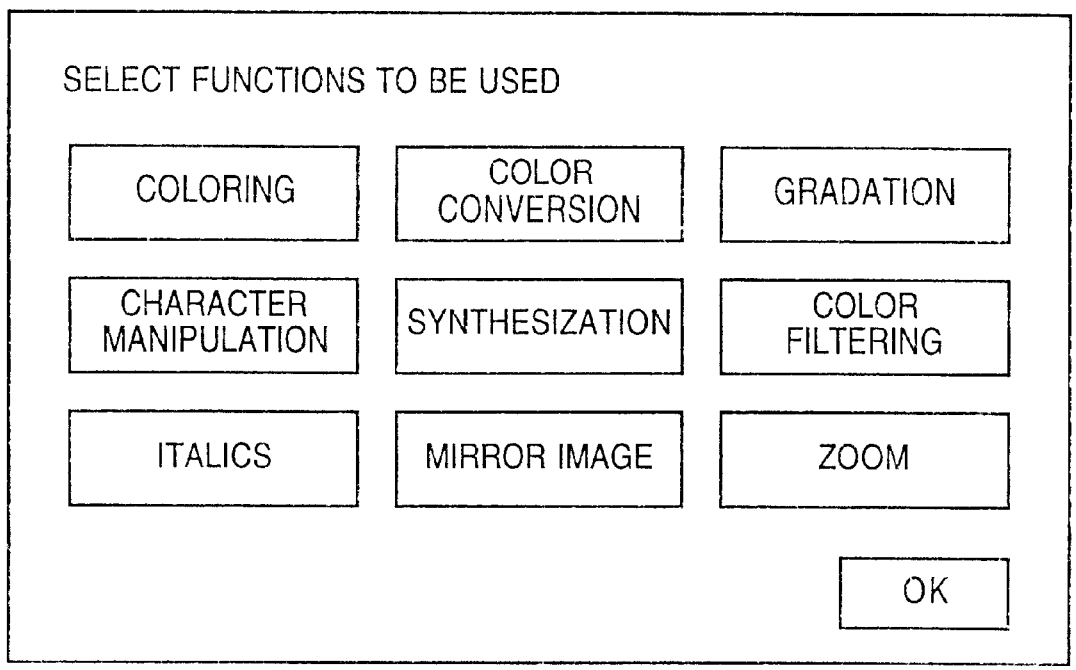
FIG. 4 is a diagram showing an example of a function selection menu displayed on the display screen of a control panel.

A function selection screen is displayed on the display unit of the control panel 114 at step S1 in FIG. 3. FIG. 4 is a diagram showing an example of a display of a function selection menu. The user selects the function desired to be implemented from this function selection screen. To this end, monitoring is performed at step S2 to determine whether a selection command has been entered. The selection input is made by touching the position of the function being displayed on the display unit. More specifically, the user need only touch one of the items in the display menu shown in FIG. 4.

If a selection command has been entered, processing proceeds to from step S2 to step S3, at which it is determined whether an "OK" key has been touched. If the "OK" key has not been touched, processing proceeds to step S4, at which the selection command entered at step S2 is temporarily retained in a register (not shown) in the CPU 112. Processing then returns to step S2, at which the apparatus waits for the next input command.

Thus, the user successively selects functions that are to be used in the apparatus. When the selection of all functions is completed, the user touches the "OK" key. If it is judged that the "OK" key has been touched, processing proceeds from step S3 to step S5, where the CPU 112, on the basis of the input command that has been stored in the above-mentioned register, accesses to the ROM 113 to read out the PGA internal data that corresponds to the initially selected function. This is followed by step S6, at which the read internal data of the PGA is downloaded to the corresponding PGA. Next, at step S7, it is determined whether the downloading of all selected functions indicated by the input command temporarily retained in the register is finished. If the downloading of all functions is not finished, processing returns to step S5, at which the downloading of the next function is performed.

It should be noted that after selection of functions by the user is finished owing to an input from the "OK" key, a menu relating solely to control of the selected function is displayed as well as a selection of options on the display unit.

If it is found at step S7 that the downloading of all selected functions is finished, then processing proceeds to step S8, at which the CPU 112 selectively starts up a control program that controls a selected function, thereby establishing an operating state. Since a function thus selected is capable of being used, a transition is made to the next processing operation.

It should be noted that data corresponding to all functions in specifications capable of being achieved by the apparatus of this embodiment may be stored in the ROM 113. Alternatively, a part of the data may be stored and the rest of the data may be supplied by replacing the ROM or by providing additional ROM in accordance with the user's needs.

In this embodiment, the Xilinx "XC4000", for example, can be used as the above-mentioned PGA. The XC4000 has embedded general-purpose logic that covers a wide range of hardware, and the wiring between items of general-purpose logic can be programmed by software. For example, the general-purpose logic includes logic used frequently in processing, such as logic for comparing two variables, logic for computing the average value of a plurality of variables, logic for entering a plurality of variables and selecting one of the input variables in accordance with separately entered control variable, and logic for extracting a specific bit (single or plural) from an entered string of bits.

With the XC4000, a bit stream (internal data) for programming (configuring) the function of a device implemented by a PGA is generated at the time of development to define the I/O, logic and wiring element items. The bit stream is loaded from an external device at start-up of the power supply. Though a serial ROM, EPROM and CPU are conceivable as the external devices, in this embodiment the ROM 113 is used and the bit stream is stored in the ROM 113, as mentioned above.

Figure 5:
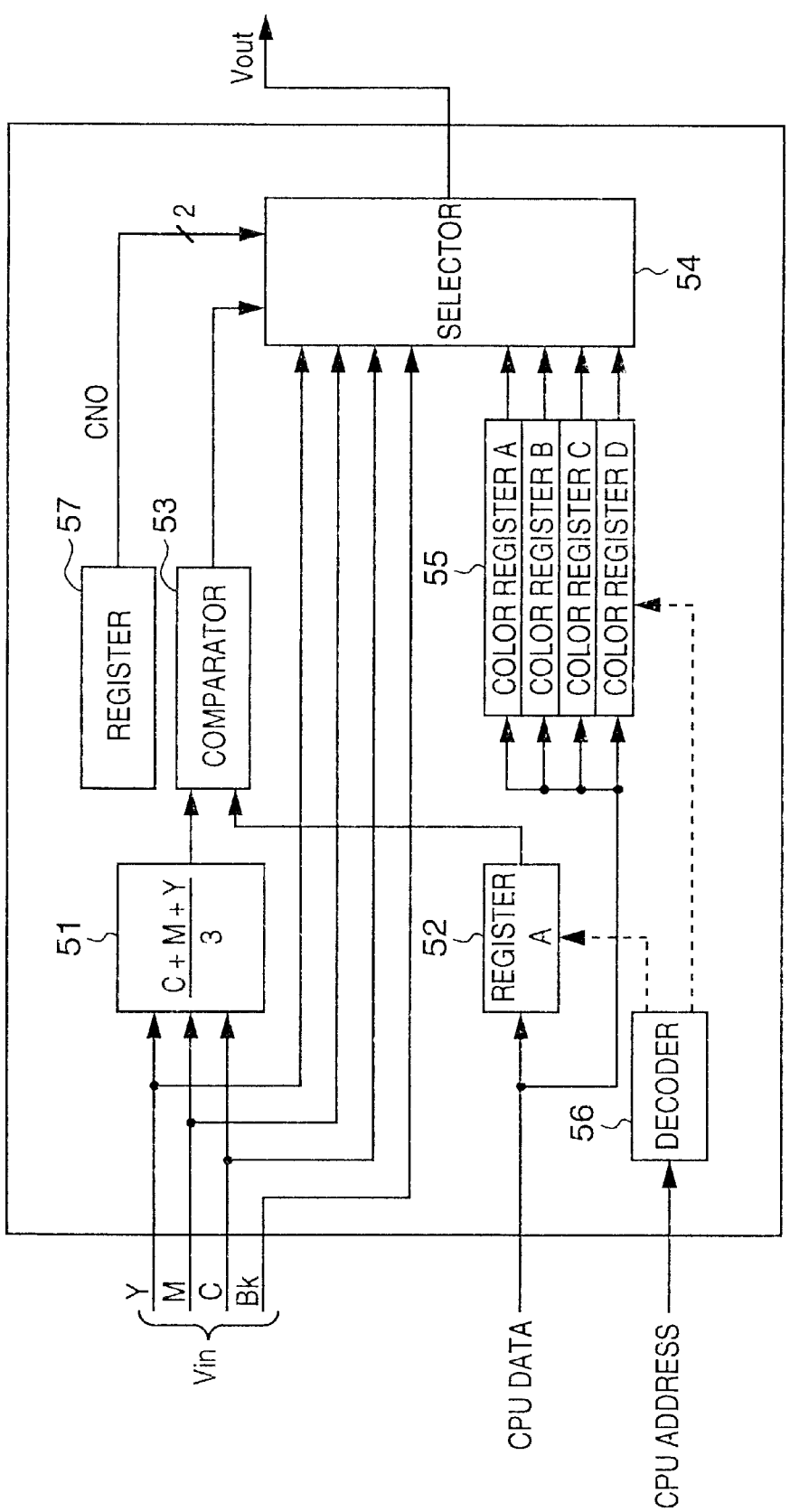
FIG. 5 is a diagram showing an example of the construction of a programmable gate array which implements a coloring function.

An example of an arrangement and the operation thereof, employed after the setting of the internal data, for implementing the above-described functions by programming information into the PGA will be described with reference to FIG. 5. FIG. 5 is a diagram showing the setting of a PGA and the operation thereof for implementing a coloring function included in the color editing processing block 108.

The PGA shown in FIG. 5 includes the above-mentioned comparison logic (comparator 53), average-value computation logic (averaging circuit 51) and selection logic (selector 54). The actual operation of this circuitry is in accordance with PGA internal data read out of the ROM 113 and set in a register (A) 52 and in color registers (A–D) 55. In other words, the PGA shown in FIG. 5 is a circuit which implements the coloring function only after the internal data of the PGA has been set. Operation becomes possible in similar fashion with regard also to the functions included in the color editing processing block 108 and image-quality tuning processing block 110.

In the case of the coloring function, the average value of the density values of the three components C, M, Y is obtained by the averaging circuit 51. This average density value is compared with the set value in register (A) 52 by the comparator 53. When the average density value is greater than the set value in the register (A) 52, the selector 54 operates to substitute the densities that have been set in the color registers (A–D) 55.

The output of the selector 54 is delivered one color at a time for every color component in accordance with a 2-bit color designation signal (CNO), capable of designating each of the four color components, stored in a register 57. Accordingly, a threshold value of density to be an object of comparison or a color component to be the object of comparison is changed over successively by a decoder 56, and this changeover is accompanied by a changeover in the color output by the selector 54 as well.

According to this embodiment, the CPU 112 is used in common for processing associated with operation/display and configuration of image processing. However, it goes without saying that a special-purpose CPU may be used in each processing operation or that common use can be made of a CPU for controlling the copying sequence.

Further, in this embodiment, the user is made to select a function to be implemented by the apparatus whenever the power supply is turned on. However, an arrangement may be adopted in which a selection command entered the first time following installation of the apparatus is backed up in a non-volatile memory such as an EEPROM and this data is utilized the next time the power supply is turned on. This frees the user from making the selection of the image processing function every time the power supply is turned on.

Furthermore, the transfer of data from the above-mentioned ROM to the PGA usually is carried out during warm-up of the apparatus when the power supply is turned on. However, in a case where a function is to be added on or altered during the operation of the apparatus, the data relating to the add-on/alteration can be transferred when the downloading from the ROM to the PGA is commanded at the control panel.

In accordance with the above-described embodiment, therefore, an image processing apparatus having an image editing function or an image-quality tuning function is such that functions actually used are selected by the operator and information corresponding to each selected function is programmed in a PGA, whereby the function is implemented. As a result, only functions which the user deems necessary can be make operational. This makes it unnecessary to provide the apparatus with hardware equipped with all functions relating to an image editing function or image-quality tuning function. The end result is that it is possible to reduce the scale of hardware.

Only operating information relating to functions capable of being implemented is displayed on the display screen of the control panel by selecting the functions. As a result, the information displayed on the control screen is reduced and it is possible to make less troublesome the operation of selecting various processing relating to image processing.

(Second Embodiment)

In the embodiment set forth above, a case is described in which the internal data of a PGA is stored in the ROM 113 in advance, the PGA internal data corresponding to functions selected from this data is read out and then downloaded. However, this does not impose a limitation upon the invention. For example, a memory such as an EEPROM to which information can be written may be provided inside the apparatus instead of the ROM, data necessary for configuring the PGA can be written to this memory temporarily and then set in the PGA.

Thus, the capacity of the ROM 113 can be reduced and, at the same time, the breadth of selection and exchange of the necessary functions can be expanded with ease.

An externally replaceable memory such as an IC card may be used as means for supplying the write data to an EEPROM.

Furthermore, note that the number of functions that can be stored in one block and the number of areas capable of being edited are decided by the capacity of an FPGA (field programmable gate array). In a case where a different function has been downloaded to this FPGA, the number of types of parameters capable of being entered by the user also changes with a change in the type of function. Accordingly, if the information necessary for controlling all usable functions through use of a control panel 114 is provided internally of the apparatus, it is required to make use of memory for storing information corresponding to control even of functions that have not been downloaded, namely functions that cannot be used. This is uneconomical.

In this embodiment, therefore, a function to be downloaded and control software relating to the control of this function may be managed as a whole. If downloading of a function to be used is specified, the software necessary for controlling this function also is installed in the apparatus automatically at the same time, thereby making it possible to implement the necessary function with less memory.

Figure 6:
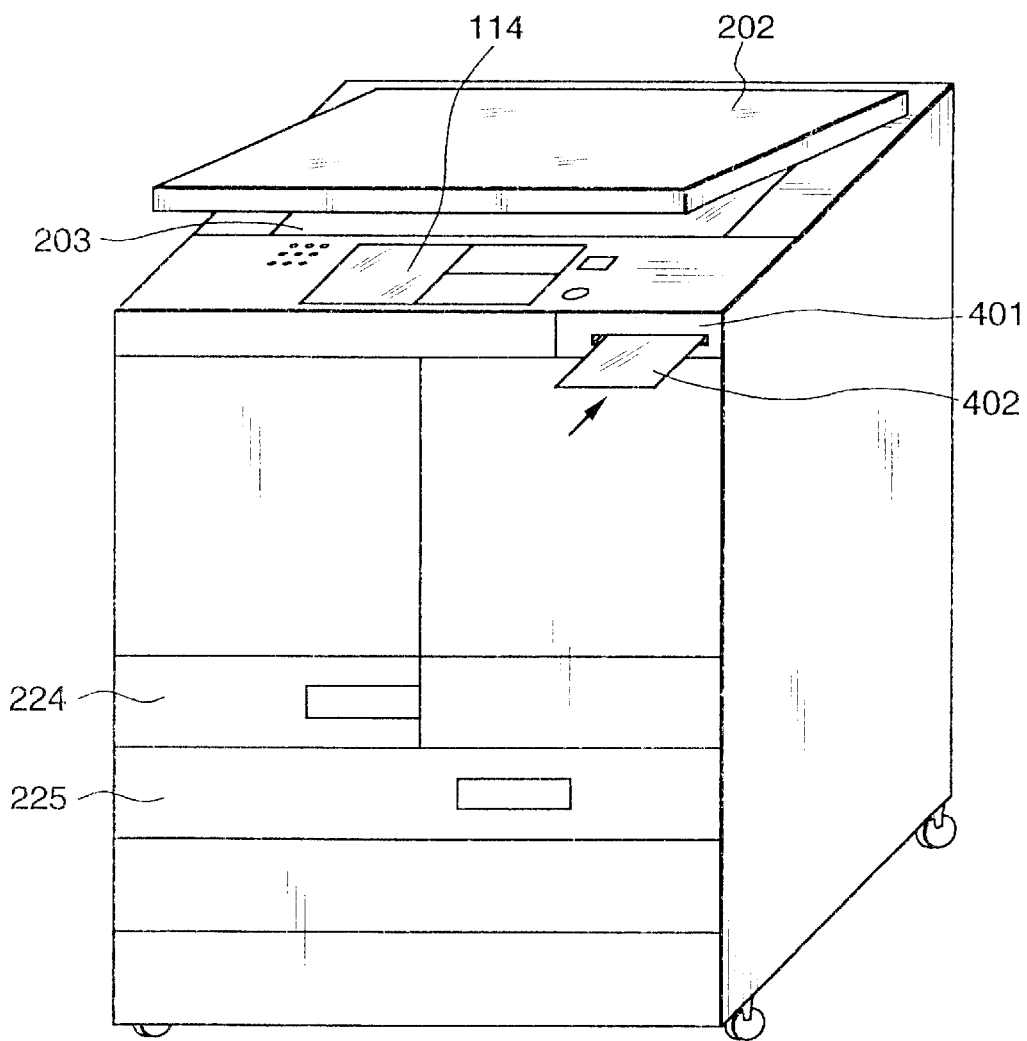
FIG. 6 is an external perspective view showing the construction of a color copier in accordance with a second of the present invention.

FIG. 6 illustrates the external appearance of a color copier in accordance with the second embodiment of the present invention adapted as mentioned above, and FIG. 7 is a block diagram showing circuitry relating to image processing executed by this color copier. This embodiment will be described in detail with reference to FIGS. 6 and 7. Components similar to those shown in FIGS. 1 and 2 of the foregoing embodiment are designated by like reference characters and need not be described again.

Figure 7:
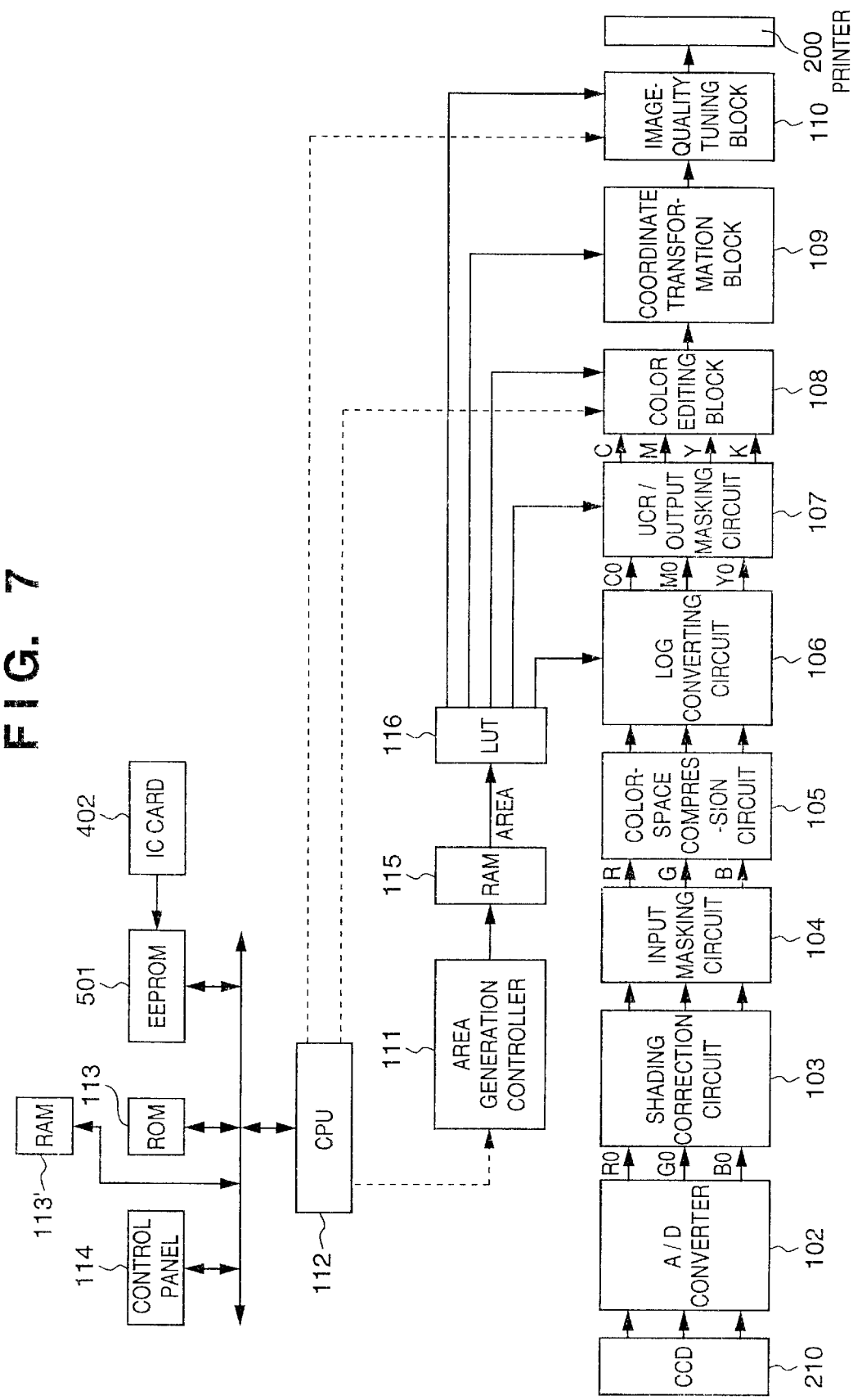
FIG. 7 is a block diagram showing the construction of a circuit relating to image processing executed by the color copier of FIG. 6.

As shown in FIGS. 6 and 7, the copier has a card holder 401 into which an IC card 402 is inserted, and an EEPROM 501 for storing data read in from the IC card 402. According to this embodiment, the IC card 402, on which PGA internal data has been stored, is inserted into the card holder 401 so that the stored content is read by the CPU 112, the read content (PGA internal data) is written to the EEPROM 501, and the PGA internal data is then downloaded to the corresponding PGA that has been selected.

The operation of the color copier shown in FIGS. 6 and 7 will now be described.

When the IC card 402 storing functions desired by the user is inserted into the card holder 401, a list of the functions that have been stored on the IC card are displayed on the display screen of the control panel 114. The user selects the necessary functions from this list. Data conforming to the tendency of function use by a specific user can be stored on the IC collectively beforehand in the manner of an "Office Function Set" or "Designer Function Set", etc.

In addition to this method of selectively downloading information corresponding to required functions from data stored on the IC card, another method is to download the data sets from the IC card as they are and then use them. This means that the user need not perform the task of making selections.

In accordance with this embodiment, the advantages of the first embodiment are supplemented by the ability to alter and add functions more flexibly. As a result, this embodiment makes it possible to readily deal with situations in which it is desired to enhance functionality during the operation of the apparatus.

(Third Embodiment)

In the first and second embodiments described above, it is necessary to actually operate the apparatus to confirm the operation of a selected function. Consequently, until the apparatus is actually operated, the user cannot know whether a function has been selected mistakenly or whether selection of a required function has been forgotten.

According to this embodiment, therefore, sample image data is stored on the IC card in advance and an image is printed out based upon the sample image data before the actual PGA internal data is downloaded, thereby making it possible to visually verify which function will form which image.

The components and operation that characterize this embodiment will now be described.

FIG. 8 is a block diagram illustrating the circuitry relating to image processing executed by a color copier in accordance with this embodiment. This diagram clarifies the flow of image signals when a sample image is printed out. Components similar to those shown in FIGS. 2 and 7 are designated by like reference characters and need not be described again.

In the apparatus of this embodiment, as shown in FIG. 8, a RAM controller 111' is provided between the area generation controller 111 and the RAM 115, and a selector 701 is provided between the printer unit 200 and the image-quality tuning processing block 110. Under the control of the CPU 112, an image signal SAMPLE based upon sample image data entered from the IC card 402 is transferred to and stored in the RAM 115 via the RAM controller 111'.

Thereafter, under the control of the CPU 112, the selector 701 is changed over so that the image signal SAMPLE that has been stored in the RAM 115 is output to the printer unit 200 not via the processing blocks but directly while synchronization with the printer sequence is maintained. The sample image is printed out as a result.

In accordance with the third embodiment described above, what effect a function contained in an IC card or the like will actually have on an image can be visually verified in advance. This makes it possible to correctly configure a PGA for function selection more reliably.

In the example set forth above, the sample image data is stored in the RAM 115 and is subsequently printed out. However, this does not impose a limitation upon the invention. The confirmation of an image formed by a selected function can be performed without relying upon a printout. For example, if the apparatus is equipped with a display for verifying an image or if the apparatus is capable of being connected to a computer equipped with a monitor display, verification of the image formed by the selected function may be performed by displaying the image on these displays.

The present invention can be applied to a system constituted by a plurality of devices (e.g., a host computer, interface, reader, printer, etc.) or to an apparatus comprising a single device (e.g., a copier or facsimile machine, etc.). Furthermore, it goes without saying that the invention is applicable also to a case where the object of the invention is attained by supplying a storage medium storing the program codes of the software for performing the aforesaid functions of the foregoing embodiments to a system or an apparatus, reading the program codes with a computer (e.g., a CPU or MPU) of the system or apparatus from the storage medium, and then executing the program.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, the present invention covers a case where an operating system or the like working on the computer performs a part of or the entire process in accordance with the designation of program codes and implements the functions according to the embodiments.

The present invention further covers a case where, after the program codes read from the storage medium are written in a function extension board inserted into the computer or in a memory provided in a function extension unit connected to the computer, a CPU or the like contained in the function extension board or function extension unit performs a part of or the entire process in accordance with the designation of program codes and implements the function of the above embodiment.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for implementing a plurality of image processing functions by a programmable gate array, comprising:

input means for, from an external device, inputting a plurality of programs necessary to implement the plurality of image processing functions and sample image data which indicates results of implementation when an image processing function decided in accordance with the program has been executed;

a first memory temporarily storing the plurality of programs inputted by said input means;

a second memory temporarily storing the sample image data inputted by said input means;

designating means for designating a desired image processing function from the plurality of image processing functions;

loading means for reading a program that corresponds to the image processing function designated by said designating means out of said first memory and loading the program into the programmable gate array so that the desired image processing function can be implemented;

image forming means for forming an image based upon image data obtained as a result of implementing the image processing function; and output means for visually outputting the sample image data before the program is loaded by said loading means.

2. The apparatus according to claim 1, wherein said designating means includes:

a display displaying the plurality of image processing functions; and selection means for selecting the desired image processing function from the plurality of image processing functions displayed on said display.

3. The apparatus according to claim 2, wherein said external device includes an IC card.

4. The apparatus according to claim 2, said designating means further comprises display control means for performing control so as to display the plurality of image processing functions on said display based upon data necessary to implement the plurality of image processing functions, which are included in the external device.

5. The apparatus according to claim 4, wherein said display control means performs control in such a manner that after a selection is made by said selection means, only manipulation information relating to the image processing function selected by said selection means is displayed on said display.

6. The apparatus according to claim 1, wherein the plurality of image processing functions includes an image editing function and an image-quality tuning function.

7. The apparatus according to claim 1, wherein said output means forms an image based on the sample image data.

8. An image processing method for implementing a plurality of image processing functions by a programmable gate array based upon data necessary to implement the plurality of image processing functions, which have been stored in a memory, comprising:

an input step of, from an external device, inputting a plurality of programs necessary to implement the plurality of image processing functions and sample image data which indicates results of implementation when an image processing function decided in accordance with the program has been executed;

a storage step of temporarily storing the plurality of programs and sample image data, which have been inputted at said input step, into a memory;

a designating step of designating a desired image processing function from the plurality of image processing functions; and a loading step of reading a program that corresponds to the image processing function designated at said designating step out of the memory and loading the program into the programmable gate array so that the desired image processing function can be implemented;

an image forming step of forming an image based upon image data obtained as a result of implementing the image processing function; and an output step of visually outputting the sample image data before the program is loaded at said loading step.

9. The method according to claim 8, wherein said designating step includes:

a display step of displaying the plurality of image processing functions on a display screen; and a selection step of selecting the desired image processing function from the plurality of image processing functions displayed on the display screen.

10. The method according to claim 9, wherein said designating step further comprises a display control step of displaying the plurality of image processing functions on the display screen based upon data necessary to implement the plurality of image processing functions, which are included in the external device.

11. The method according to claim 10, wherein said display control step performs control in such a manner that after a selection is made at said selection step, only manipulation information relating to the image processing function selected at said selection step is displayed on the display screen.

12. The method according to claim 8, wherein the plurality of image processing functions includes an image editing function and an image-quality tuning function.

13. The method according to claim 8, wherein said output step forms an image based on the sample image data.

14. A computer program product comprising a computer readable medium having computer program code, for executing download processing, said product including:

input process procedure codes of, from an external device, inputting a plurality of programs necessary to implement a plurality of image processing functions and sample image data which indicates results of implementation when an image processing function decided in accordance with the program has been executed;

storage process procedure codes of temporarily storing the plurality of programs and sample image data, which have been inputted at said input process, into a memory;

designation process procedure codes for designating a desired image processing function from the plurality of image processing functions; and download process procedure codes for reading a program that corresponds to the image processing function designated in the designation process out of the memory in which data necessary to implement the plurality of image processing functions have been stored, and downloading the program into a programmable gate array, which implements the image processing functions, so that the desired image processing function can be implemented;

image forming process procedure codes of forming an image based upon image data obtained as a result of implementing the image processing function; and output process procedure codes of visually outputting the sample image data before the program is downloaded at said download process.

15. The computer program product according to claim 14, wherein said designation process procedure codes include:

display process procedure codes for displaying the plurality of image processing functions on a display screen; and selection process procedure codes for selecting the desired image processing function from the plurality of image processing functions displayed on the display screen.

16. An image forming apparatus for forming an image based on image data which has been obtained after subjected to color editing and image quality adjusting, comprising:

a first programmable gate array for performing the color editing on inputted image data;

a second programmable gate array for performing the image quality adjusting on image data obtained from said first gate array programmable gate array;

image forming means for forming an image based on image data obtained from said second programmable gate array;

a memory for storing a program necessary to perform a color editing function and an image quality adjusting function;

designating means for designating a desired color editing function and a desired image quality adjusting function from a plurality of image processing functions;

loading means for reading a program that corresponds to the color editing function designated by said designating means out of said memory, loading the program into said first programmable gate array, reading a program that corresponds to the image quality adjusting function designated by said designating means out of said memory and loading the program into said second programmable gate array so that the desired color editing function and the desired image quality adjusting function can be implemented.

17. The apparatus according to claim 16, wherein said designating means includes:

a display displaying the plurality of image processing functions; and selection means for selecting the desired color editing function and the desired image quality adjusting function from the plurality of image processing functions displayed on said display.

18. The apparatus according to claim 17, further comprising input means for inputting a program necessary to implement the desired color editing function and the desired image quality adjusting function from an external device; and a second memory for temporarily storing the program inputted by said input means.

19. The apparatus according to claim 18, wherein said external device includes an IC card.

20. The apparatus according to claim 18, wherein said loading means reads the program out of said second memory and loads the program into said first and second programmable gate arrays.

21. The apparatus according to claim 18, wherein said designating means further comprises display control means for performing control so as to display the color editing function and the image quality adjusting function on said display based upon the program, which is included in the external device.

22. The apparatus according to claim 21, wherein said display control means performs control in such a manner that after a selection is made by said selection means, only manipulation information relating to the color editing function and the image quality adjusting function selected by said selection means is displayed on said display.

23. The apparatus according to claim 16, wherein the color editing function implemented by said first programmable gate array includes a plurality of coordinate transformation functions.

24. An image forming method of forming an image based on image data which has been obtained after subjected to color editing and image quality adjusting, comprising:

a storage step of storing a program necessary to perform a color editing function and an image quality adjusting function, into a memory;

a designating step of designating a desired color editing function and a desired image quality adjusting function from a plurality of image processing functions;

a loading step of reading a program that corresponds to the color editing function designated at said designating step out of the memory, loading the program into a first programmable gate array, reading a program that corresponds to the image quality adjusting function designated at said designating step out of the memory and loading the program into a second programmable gate array so that the desired color editing function and the desired image quality adjusting function can be implemented;

a color editing step of performing the desired color editing function on inputted image data in the first programmable gate array;

an image quality adjusting step of performing the desired image quality adjusting function on image data obtained at said color editing step in the second programmable gate array;

an image forming step of forming an image based on image data obtained at said image quality adjusting step.

25. The method according to claim 24, wherein said designating step includes:

a display step of displaying the plurality of image processing functions on a display screen; and a selection step of selecting the desired color editing function and the desired image quality adjusting function from the plurality of image processing functions displayed on the display screen.

26. The method according to claim 25, further comprising an input step of inputting a program necessary to implement the desired color editing function and the desired image quality adjusting function from an external device, wherein said storage step temporarily stores the program inputted at said input step.

27. The method according to claim 26, wherein said loading step reads the temporarily stored program out of the memory and loads the program into the first and second programmable gate arrays.

28. The method according to claim 26, wherein said designating means further comprises a display control step of performing control so as to display the color editing function and the image quality adjusting function on the display screen based upon the program, which is included in the external device.

29. The method according to claim 28, wherein said display control step performs control in such a manner that after a selection is made at said selection step, only manipulation information relating to the color editing function and the image quality adjusting function selected at said selection step is displayed on the display screen.

30. The method according to claim 24, wherein the color editing function implemented into the first programmable gate array includes a plurality of coordinate transformation functions.

31. A computer program product comprising a computer readable medium having computer program code, for executing an image forming processing of forming an image based on image data which has been obtained after subjected to color editing and image quality adjusting, said product including:

storing process procedure codes of storing a program necessary to perform a color editing function and an image quality adjusting function, into a memory;

designating process procedure codes of designating a desired color editing function and a desired image quality adjusting function from a plurality of image processing functions;

loading process procedure codes of reading a program that corresponds to the color editing function designated at the designating process out of the memory, loading the program into a first programmable gate array, reading a program that corresponds to the image quality adjusting function designated at said designating process out of the memory and loading the program into a second programmable gate array so that the desired color editing function and the desired image quality adjusting function can be implemented;

color editing process procedure codes of performing the desired color editing function on inputted image data in the first programmable gate array;

image quality adjusting process procedure codes of performing the desired image quality adjusting function on image data obtained by the color editing process in the second programmable gate array;

image forming process procedure codes of forming an image based on image data obtained by the image quality adjusting process.

32. The computer program product according to claim 31, wherein said designating process procedure codes includes:

display process procedure codes of displaying the plurality of image processing functions on a display screen; and selection process procedure codes of selecting the desired color editing function and the desired image quality adjusting function from the plurality of image processing functions displayed on the display screen.

* * * * *

UNITED STATES PATENT AND TRADEMARK OFFICE
CERTIFICATE OF CORRECTION

PATENT NO. : 6,252,609 B1
DATED : June 26, 2001
INVENTOR(S) : Akiko Kanno

It is certified that error appears in the above-identified patent and that said Letters Patent is hereby corrected as shown below:

<u>Title page,</u>
Item [56], OTHER PUBLICATIONS, "manuel" should read -- manual --.

<u>Column 5,</u>
Line 47, "CCD 201." should read -- CCD 210. --.

<u>Column 12,</u>
Line 33, "said" should read -- wherein said --; and
Line 67, "and" should be deleted.

<u>Column 13,</u>
Line 38, "of" should read -- to input --;
Line 39, "inputting" should be deleted;
Line 44, "of" should read -- to --;
"storing" should read -- store --;
Line 46, "at" should read -- in --;
Line 48, "for designating" should read -- to designate --;
Line 50, "and" should be deleted;
Line 51, "for reading" should read -- to read --;
Line 56, "downloading" should read -- download --;
Line 60, "of forming" should read -- to form --;
Line 63, "of" should read -- to --; and
"outputting" should read -- output --.

<u>Column 14,</u>
Line 3, "for displaying" should read -- to display --;
Line 6, "for selecting" should read -- to select --;
Line 11, "after" should read -- after being --;
Line 17, "gate array" (first occurrence) should be deleted;
Line 26, "functions;" should read -- functions; and --; and
Line 46, "prising input" should read
-- prising:
      input --.

<u>Column 15,</u>
Line 10, "after" should read -- after being --; and
Line 35, "array;" should read -- array; and --.

UNITED STATES PATENT AND TRADEMARK OFFICE
CERTIFICATE OF CORRECTION

PATENT NO. : 6,252,609 B1
DATED : June 26, 2001
INVENTOR(S) : Akiko Kanno

It is certified that error appears in the above-identified patent and that said Letters Patent is hereby corrected as shown below:

<u>Column 16,</u>
Line 18, "after" should read -- after being --;
Line 21, "of storing" should read -- to store --;
Line 24, "of designating" should read -- to designate --;
Line 28, "of reading" should read -- to read --;
Line 31, "loading" should read -- load --;
Line 32, "reading" should read -- read --;
Line 34, "loading" should read -- load --;
Line 38, "of performing" should read -- to perform --;
Line 41, "of" should read -- to --;
Line 42, "forming" should read -- form --;
Line 44, "array;" should read -- array; and --;
Line 45, "of forming" should read -- to form --;
Line 49, "includes:" should read -- include: --;
Line 50, "of displaying" should read -- to display --; and
Line 53, "of selecting" should read -- to select --.

Signed and Sealed this

Twenty-first Day of January, 2003

JAMES E. ROGAN
*Director of the United States Patent and Trademark Office*